United States Patent [19]

Krambrock et al.

[11] Patent Number: 4,979,756

[45] Date of Patent: Dec. 25, 1990

[54] SEAL ARRANGEMENT

[75] Inventors: Wolfgang Krambrock, Vogt; Helmut Bercx, Wolfegg, both of Fed. Rep. of Germany

[73] Assignee: AVT Anlagen- und Verfahrenstechnik GmbH, Weingarten, Fed. Rep. of Germany

[21] Appl. No.: 357,417

[22] Filed: May 26, 1989

[30] Foreign Application Priority Data

Jun. 3, 1988 [DE] Fed. Rep. of Germany ....... 3818873
Jul. 15, 1988 [DE] Fed. Rep. of Germany ....... 3824023
Jan. 11, 1989 [DE] Fed. Rep. of Germany ....... 3900580

[51] Int. Cl.$^5$ .................... F16J 15/16; F16L 7/00; F16K 25/00
[52] U.S. Cl. ...................... 277/27; 137/375; 251/172; 277/34; 277/71; 277/79; 277/177; 277/205; 277/209
[58] Field of Search .............. 277/3, 6, 27, 34, 34.3, 277/34.6, 81, 173, 177, 71, 205, 209, 174; 251/172, 175; 137/375

[56] References Cited

U.S. PATENT DOCUMENTS

| | | |
|---|---|---|
| 1,990,309 | 7/1935 | Phillips . |
| 3,463,448 | 8/1969 | Piccardo . |
| 3,508,738 | 4/1970 | Atkinson et al. ............ 251/172 X |
| 3,542,072 | 11/1970 | Harris et al. . |
| 3,580,540 | 5/1971 | Heinen . |
| 3,584,641 | 6/1971 | Milleville et al. ............ 251/172 X |
| 3,867,958 | 2/1975 | Turnwald ................ 137/375 |
| 4,269,218 | 5/1981 | Sudo ........................ 137/375 |
| 4,381,114 | 4/1983 | Vanderford, Jr. . |
| 4,384,724 | 5/1983 | Derman . |
| 4,545,408 | 10/1985 | Sonneborn ................ 277/27 X |
| 4,714,234 | 12/1987 | Falk et al. ................. 137/375 X |
| 4,747,578 | 5/1988 | Kivipelto et al. ........... 251/175 X |

FOREIGN PATENT DOCUMENTS

| | | |
|---|---|---|
| 0125896 | 11/1984 | European Pat. Off. . |
| 0016435 | 1/1985 | European Pat. Off. . |
| 829509 | 1/1952 | Fed. Rep. of Germany . |
| 915287 | 7/1954 | Fed. Rep. of Germany . |
| 1155057 | 9/1963 | Fed. Rep. of Germany . |
| 1550132 | 7/1969 | Fed. Rep. of Germany . |
| 2148557 | 5/1973 | Fed. Rep. of Germany . |
| 2623822 | 12/1977 | Fed. Rep. of Germany . |
| 197810 | 10/1978 | Fed. Rep. of Germany ........ 277/27 |
| 2931779 | 2/1980 | Fed. Rep. of Germany . |
| 641188 | 8/1950 | United Kingdom ............. 251/172 |
| 788873 | 1/1958 | United Kingdom . |
| 1447628 | 8/1976 | United Kingdom . |

Primary Examiner—Allan N. Shoap
Assistant Examiner—Scott W. Cummings
Attorney, Agent, or Firm—Spencer & Frank

[57] ABSTRACT

A ring seal on moved machine parts, in particular for use on a rotary slide valve, is proposed, which is formed by a pressurized annular channel (11) with a ring seal (12). In a connection flange (10), for this purpose an annular channel (11), parallel to the center axis (19), is formed with a pressure space (15) for pressurization of the ring seal (12).

7 Claims, 5 Drawing Sheets

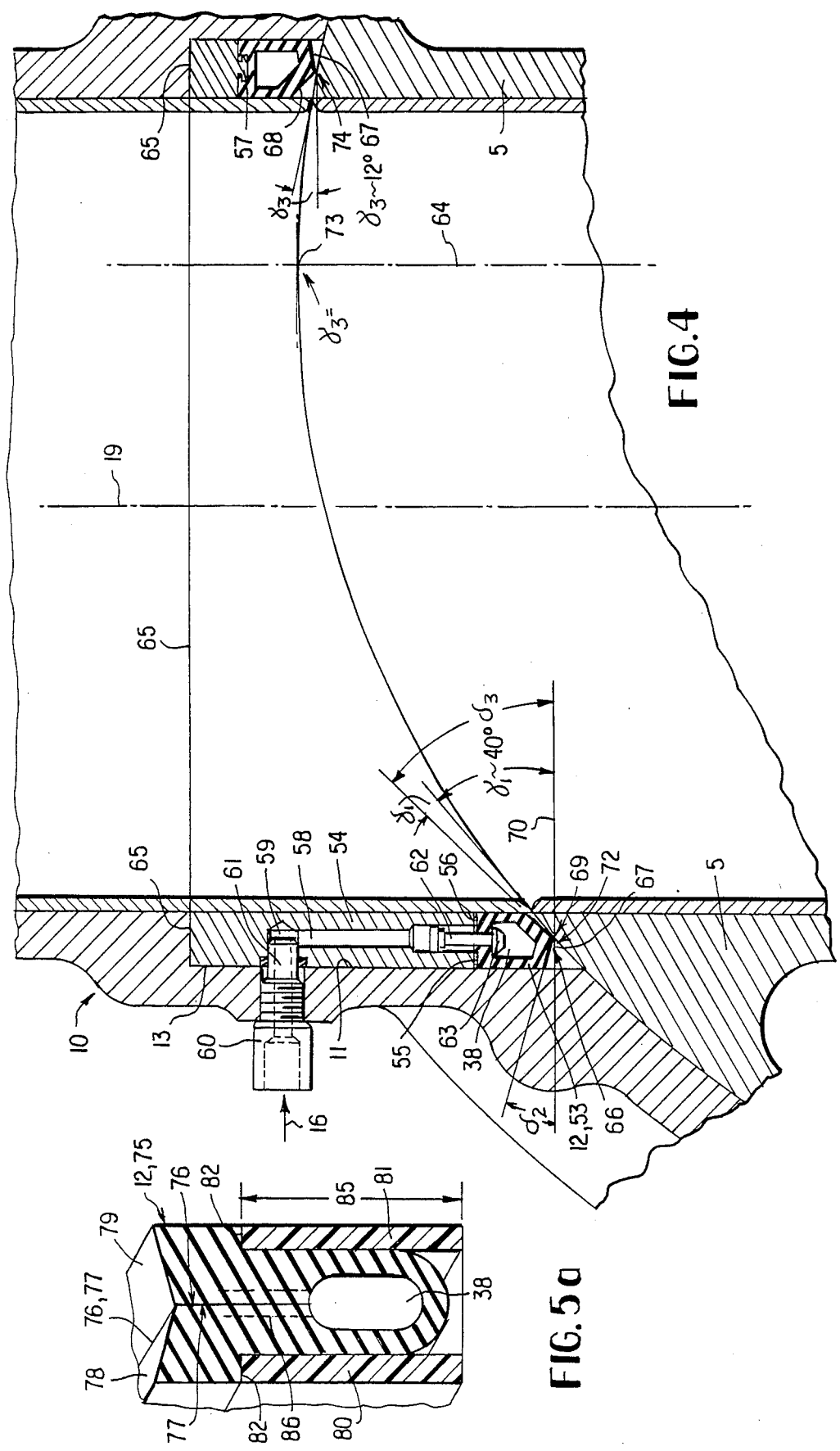

SEAL ARRANGEMENT

BACKGROUND OF THE INVENTION

The invention relates to a central or eccentric ring seal arrangement, and in particular to a seal arrangement for a rotary slide valve or the like with convex surface.

Shut-off elements according to the invention are cocks or rotary slide valves which have a shutting-off part referred to as a cock plug or cone plug, which may be of conical, cylindrical or spherical design. Depending on the type, the cock plug has passages in the shape of an I, L, T, X or V, which are brought into the desired operating position by turning of the plug. The sealing-off of such rotary slide valves from the outside and the connecting lines among them often present problems. Such a shut-off element, referred to as a pipe switch, has become known from German Offenlegungsschrift No. 2,148,557, in which the end openings of the cone plug are provided with inflatable seals embracing the latter, which in the inflated state are firmly held in place between plug and inside wall of the housing. On pressure relief, the ring seal withdraws into the annular groove and no longer brushes against the inside wall of the housing when the plug is swivelled. As a result, an easy swivelling of the cone plug, associated with little expenditure of force, is possible. The pressurization of the ring seal takes place by means of valves which can be controlled independent on the swivel position of the plug. The advantage of this arrangement is that only the two end openings of the cone plug are provided with ring seals. The number of traction openings and a corresponding sealing-off in this region is consequently immaterial.

What is disadvantageous about this known arrangement are the annular grooves, to be produced only on special machines, in the case of such a cone plug. In addition, only a type of inflatable tube comes into consideration as seal, which tube can generally not assume any sealing function itself. Therefore, an additional sleeve is provided as sealing element between the inflatable seal and the inside of the housing. This sleeve, however, constantly rubs in some form against the inside wall of the housing, which can lead to a stiffness and to wear. Also disadvantageous is a complex swing joint for the air supply to the cone plug.

In the case of a further known design according to German Offenlegungsschrift No. 1,550,132, a shut-off cock has become known which uses a ring seal in the respective end opening of the housing connection flange for the sealing-off between housing and cone plug, the ring seal being arranged in a groove running radially with respect to the longitudinal axis of the bore and acting against an additional thrust ring, which is braced against the cone plug itself. This type of seal has the disadvantage that it leads to a stiffness of the cone plug due to its necessary prestress.

The same problems described above also arise in principle in the case of all devices with a housing opening to be sealed off which is to be closed by a slide valve or the like running transversely to the housing opening. During the opening or closing operation, part of the ring seal surrounding the housing opening is always without an opposing wall, which in certain circumstances can lead to the seal springing out from the annular groove. In addition, the seal is constantly subjected to shearing stress during closing of the opening, which can lead to lateral damage or to a tearing-out of the seal.

The problem addressed by the invention may occur in rotary slide valves and multi-way valves of any type in which openings are to be closed pressure tightly by a moved machine component. Equally, the problem may also occur in the case of longitudinal slide valves to be sealed off.

SUMMARY OF THE INVENTION

The invention is based on the object of proposing a seal arrangement on moved machine parts, and in particular a seal for use on a rotary slide valve, which can be used in particular in the case of convex sealing-off surfaces and can be produced by simple measures without complicated processing machines In particular, the seal is to be easy to fit and ensure an easy mobility of the machine parts with respect to one another. It is also the object to create a seal arrangement which returns into the initial position of its own accord upon pressure relief and does not drop out if there is jamming between the seal and the movable machine part.

The invention is based in principle on the same underlying idea as that realized in DE No. 2,148,557. According to the invention, however, an annular gap or annular channel is created in the connection flange of the housing, a pressure space for pressure medium being provided behind the ring seal or in the ring seal itself, which space leads to a longitudinal displaceability of the seal in the manner of an annular piston, in order to press the ring seal itself or a slidable, flexible intermediate ring, secured against twisting, against the machine part to be sealed off. In comparison with the known device, this arrangement has the advantage that the seal is arranged in a stationary part in the housing and not in a movable part, such as for example a cone plug. This dispenses with complex and expensive connecting means for the pressurizing of the seal with pressure medium. The annular channel region behind the seal serves as pressure space for the pressurization of the ring seal, which then presses in the manner of an annular piston axially against the machine part to be sealed off. In this arrangement, the pressurization takes place in principle only in the stationary state, i.e. when the movable machine part has assumed its desired end position. The movement itself takes place in the pressureless state, so that an easy adjustability of the movable machine part is ensured. Instead of or in addition to the pressure space behind the seal, the arrangement according to the invention may also have a pressure space within the seal, which makes possible an axial displaceability of the seal. What is decisive is the free mobility of the seal in the direction of the machine part to be sealed off, the seal again lifting off from the machine part in the pressureless state and not being subjected to any frictional wear during the adjustment of the plug. Therefore, measures can be provided which prevent the seal leaving the annular channel. This applies in particular to the phase where the seal is without counterpressure from a machine element.

In a further development of the invention, the seal is provided on both sides with slits or incisions, which are directed in the shape of a V in the direction of the pressure space behind. These lateral slits produce a kind of toggle lever effect on the seal, i.e. under pressure-loading, the seal is pressed downward against the machine part, supporting itself against the side wall. In this case, however, a restoring force constantly acts in the opposite direction, so that on pressure relief the seal returns again into its initial position.

An alternative embodiment provides that lateral projections on the seal and in the annular channel form a positive connection. If the seal is forced downward by pressurization, this takes place only in the central region, while the outer, positive region is held in its position. On pressure relief, a return of the seal into its initial position consequently occurs.

A further alternative design provides that, instead of the lateral slits or incisions, air inclusions or the like, likewise arranged in the shape of a V, are provided within the seal, which inclusions produce a specific seal movement likewise according to the toggle lever effect As a result, a restoring moment into the initial position likewise takes place after pressure relief.

In advantageous further development of the invention, the types of seal discussed above are glued laterally into the annular channel or the seal groove. As a result, the side surfaces of the ring seal are constantly held in their position, while the central part can be moved by pressurization downward against the machine element. The toggle lever effect described above is consequently intensified as a result.

A further embodiment provides that the ring seal has through-bores from the pressure space toward the machine element. Wherever air is used as pressure medium, consequently on pressurization an airstream initially flows through the through-bores arranged in plurality at the circumference of the ring seal. From the discharge point on the face of the ring seal, the compressed air then flows along the surface to be sealed off of the machine part. In this arrangement, the bores are dimensioned in their cross-section in such a way that the pressure in the pressure space is nevertheless adequate to move the ring seal axially against the machine part to be sealed off. As a result, a setting of the ring seal on the machine part occurs, and thus a sealing-off of the bore opening This solution has the advantage that any dirt particles in the region of the seal surface are blown away by the air pressure and the seal is pressure-relieved if, during the plug adjustment, the seal is without opposing surface and is nevertheless pressurized by pressure from the annular channel. As a result, the seal is prevented from leaving the annular channel, and thus associated damage of the seal during the plug adjustment is also prevented.

As mentioned before, the seal may also include inside it an inflatable sealing space, which leads to the pressing of the seal against the machine element.

The invention provides that the annular channel in the connection flange is formed by a housing undercut, the groove base of which is at right angles to the center axis of the connecting line. As a result, the annular channel has a different depth at each point. The annular channel can, however, be produced by simple machines, for example a conventional lathe. An additional push-in pipe on the inside bounds the annular channel inwardly.

The invention also provides that the supporting and the restoring of the inflatable ring seal in the annular channel takes place by the said seal being firmly connected at its rear to a ring insert, which for its part is arranged fixedly in the connection flange. This ring insert may consist of a cast precision part and thus be adapted to the specific shape of the annular channel. The connection flange, arranged asymmetrically with respect to the rotary slide valve housing, is consequently given an annular channel recess which is different in its axial depth at each point, the groove base forming an angle of 90° with the axis of the annular channel for easy production. This annular channel is then filled with a cast ring insert in its shape, so that the inflatable ring seal can be fastened thereto and positively supported on three sides.

It is furthermore advantageous that the inflatable ring seal is designed in the form of a V at its face facing the cone plug, the two lateral limbs not coming into contact with the cone plug in the pressureless state, for the production of a line contact of the V-shaped tip.

A further advantageous refinement of the invention provides that the retention of the inflatable ring seal is performed by slide rings or back-up rings inserted at the sides, which are fitted fixably all around in the annular channel. In this arrangement, these back-up rings are to be designed equally long in their axial length for simplified production. However, due to the curvature of the cone plug this produces a lateral difference in height between the two opposite back-up rings in the annular channel at each point, apart from the uppermost point of the cone plug. The inner back-up ring, with respect to the center axis of the connection flange, consequently lies higher in its position than the outer back-up ring. This different position is compensated for by a ring seal longitudinally slotted in its plane of symmetry The longitudinal slotting takes place above the pressure space. As a result, the two sealing halves can be axially displaced with respect to each other.

BRIEF DESCRIPTION OF THE DRAWINGS

Further features essential for the invention and advantages are described in the following description with reference to the exemplary embodiments. In the drawing.

FIG. 4 shows an exemplary embodiment with a ring insert inserted in the annular channel for the firm connection to the ring seal and FIGS. 5, 5a, 5b show a seal arrangement with back-up rings and longitudinally slotted seal.

DETAILED DESCRIPTION OF THE PREFERRED EMBODIMENTS

Figure 1:
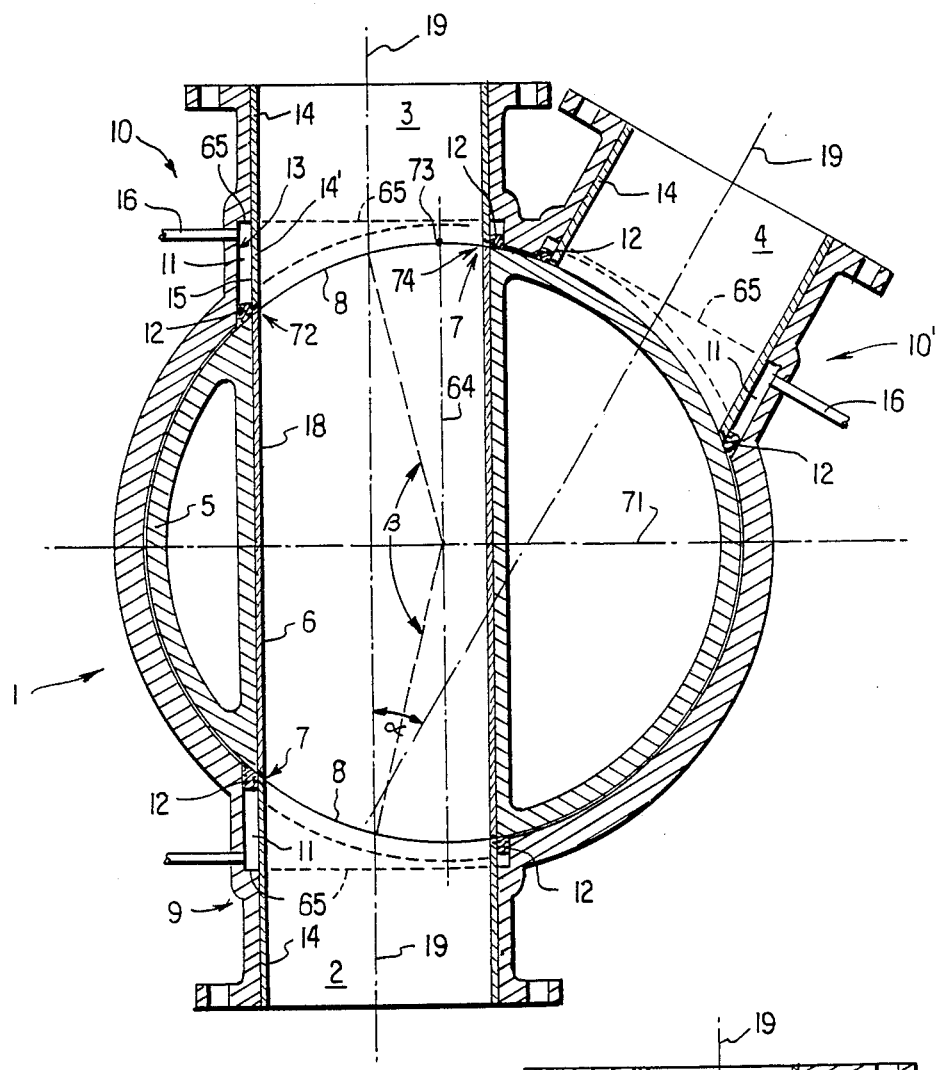
FIG. 1 shows the seal arrangement according to the invention on a rotary slide valve with cock plug with V-shaped connecting lines.

The rotary slide valve represented in FIG. 1, with the seal arrangement according to the invention, serves preferably for the transport of dust-grained, powder-grained or coarse-grained solids with the aid of a flowing gas through pneumatic conveying lines Unlike the transport of pure liquids or gases, in such an arrangement the moved parts, and in particular the branching devices or the cone plug, are subjected to considerable wear by the content of solid matter.

In the case of the three-way rotary slide valve 1 represented in FIG. 1, the transport of a gas/solid mixture takes place from an incoming pipeline 2 according to choice into two leading-off pipelines 3, 4, which are arranged at an angle α to each other In order to determine the direction of flow, a cone plug 5 is provided, which has a through-bore 6 In FIG. 1, the connecting lines 2 and 3 are connected to each other via the through-bore 6 in the cone plug If it is wished to connect the connecting line 2 to the connecting line 4, the cone plug must be turned through the angle β in order for the matching connection openings between connection flanges and cone plug to lie against each other. When carrying out the rotational movement of the cone plug 5 through the angle β for the connection of the connecting line 2 to the connecting line 4, the edges 7 of the outlet openings 8 of the through-bore 6 of the cone plug 5 brush over the outer sealing-off region in the associated connection flange 9, 10 of the pipelines 2, 3. Whenever the respective connection flange 9, 10 happens to be sealed off with a commercially available O-ring, the latter can, without the radial pressure of the cone plug 5 in the region of the outlet opening 8 brushing over the O-ring, slip out from the corresponding O-ring groove. Moreover, the O-ring is additionally subjected to shearing stress by the edge 7. This process is intensified by the behavior of the dust-grained, powder-grained or coarse-grained solids in the transport lines.

Figure 1A:
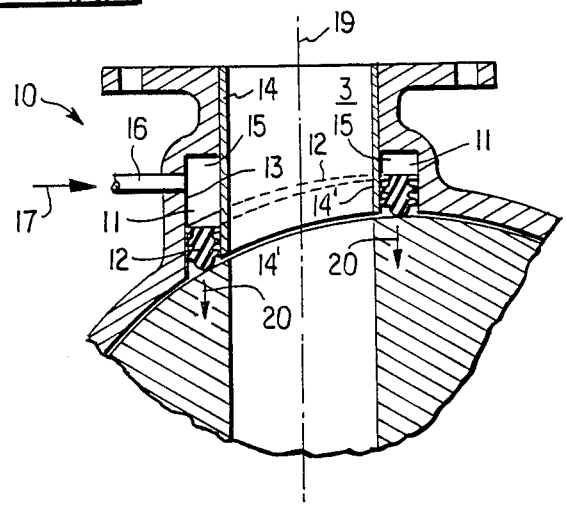
FIG. 1a shows a detailed view of FIG. 1, FIGS. 2a to c show three examples of the arrangement of the seal in FIG. 1 and FIGS. 3a to d show four embodiments of the ring seal in the annular channel.

As revealed by FIG. 1 and, in enlarged representation, in particular by FIG. 1a with reference to the upper connection flange 10, the seal arrangement according to the invention is formed by an annular channel 11, in which the ring seal 12 is located. The annular channel 11 is produced by a wall undercut 13 in the respective connection flange 9, 10 and 10′, produced by drilling out of the connecting line, and a pipe 14 let into the connection flange 9, 10, 10′. The inner pipe section 14′ then forms the inside wall for the annular channel 11. In the respective connection flange 9, 10, 10′, consequently not only an annular groove with the same dimensions as the ring seal itself is formed but also an annular channel 11 extending axially parallel to the center axis 19 of the respective connection flange. The space 15 arranged behind the ring seal 12 is referred to as pressure space. A pressure connecting line 16 is provided for this. The arrow 17 represented in FIG. 1a indicates the pressurization of the pressure space 15.

In FIG. 1, the inner pipe 14 for the formation of the annular channel 11 for the ring seal 12 is represented in all three connection flanges 9, 10, 10′. This pipe is inserted as a thin-walled pipe, for example of chrome nickel steel, in the respective connection flanges. It may also—as represented in FIG. 1—be located as a thin-walled pipe 18 in the cone plug 5. As a result, the housing parts of the rotary slide valve 1 and the cone plug 5 itself are produced from a casting material, the through-bores and also, if appropriate, the circumference of the cone plug being plated with a high-grade material, such as for example chrome nickel steel.

The connection flanges 9, 10, 10′ of the pipelines 2, 3, 4 are in principle of the same design and as described with respect to FIG. 1a for the example of the connection flange 10 of the pipeline 3.

The ring seal 12 is arranged in the annular channel 11 and surrounds the pipe 14 non-positively in its lower pipe section 14′. If the pressure space 15 lying behind the ring seal 12 is pressurized with pressure medium, for example compressed air, the ring seal is displaced in the manner of an annular piston axially parallel to the longitudinal axis 19 (see arrow 20 in FIG. 1a) and pressed directly, or via a flexible intermediate ring 26, which loosely surrounds the push-in pipe 14, is very slidable and secured against twisting, against the moved machine part 5, in the exemplary embodiment the cone plug 5. The pressure space 15 behind the ring seal 12 can in this case be kept relatively small, in order to be able &.o pressurize, and conversely also to relieve again, the ring seal rapidly with a small volume of pressure medium. If the pressure space 15 is relieved, the ring seal 12 is no longer pressed against the cone plug. The latter can then move freely in the housing of the rotary slide valve 1

Figure 2A:
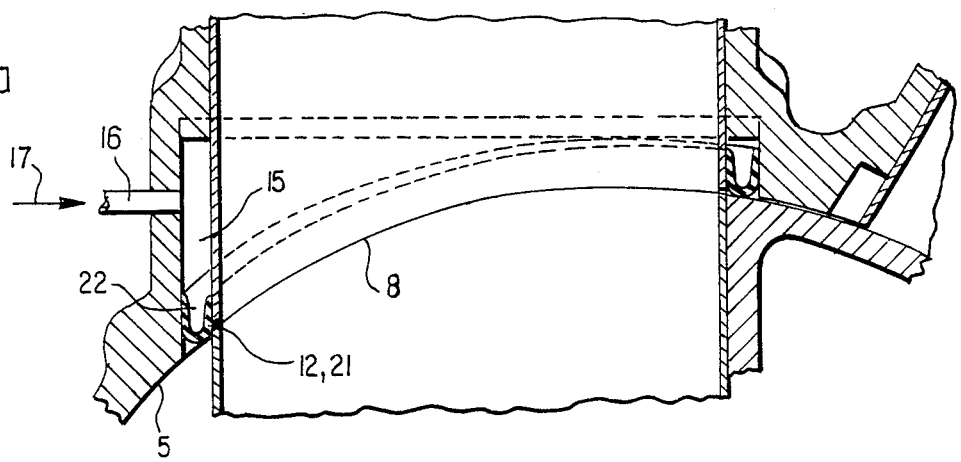
Figure 2B:
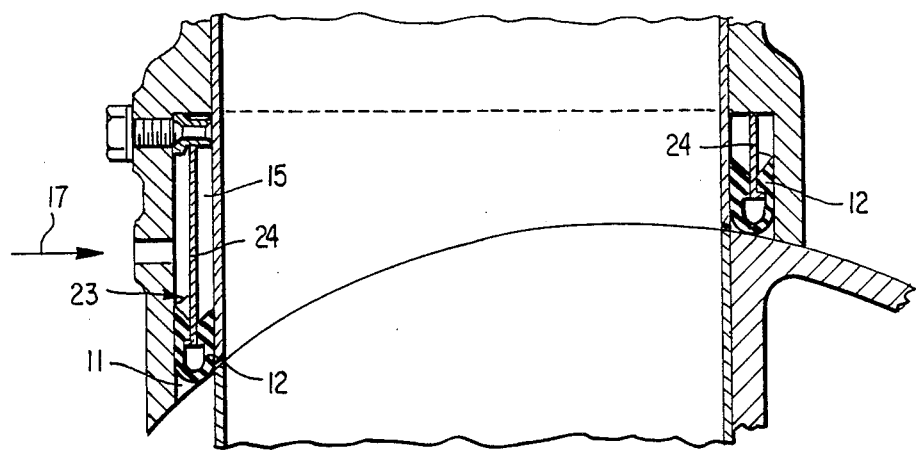
Figure 2C:
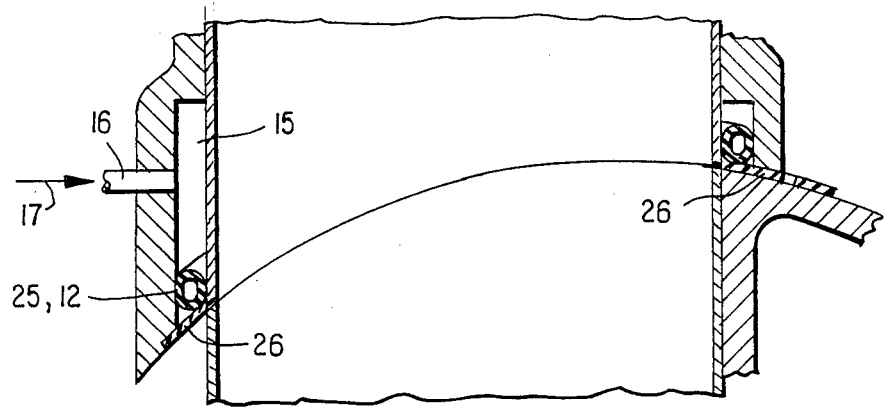

In FIGS. 2a to c, three different exemplary embodiments of a seal arrangement are represented.

According to FIG. 2a, the ring seal 12 consists of a U-shaped ring seal 21, the U-shaped cavity 22 of which, pointing toward the pressure space 15, can be pressurized with pressure medium. This design allows a very flexible ring seal, the side flanks of the ring seal 21 being pressed by the U-shaped cavity 22 against the side wall due to the internal pressure. As a result, a good fixing of the ring seal is ensured, with at the same time good mobility and contact pressure against the machine part to be moved, here the cone plug 5.

In FIG. 2b, a mechanical retaining device 23 is provided, consisting of a concentrically arranged shaped plate 24, which prevents the ring seal 12 sliding out of the annular channel 11. This arrangement requires, however, a very precise matching of ring seal 12 and sealing gap to be bridged, since the axial travel of the ring seal 12 cannot be very great in spite of the pressurization in the pressure space 15.

The exemplary embodiment of the invention according to FIG. 2c shows a hollow ring seal 12 designed as O-ring 25. The O-ring is also pressurized from the rear pressure space 15 by compressed air via the pressure line 16. Since the O-ring 25 is not to be directly in contact with the cone plug 5 to be sealed off, an intermediate ring 26 is provided as back-up ring and sealing-off ring between the O-ring 25 and the cone plug surface 5. The intermediate ring 26 is secured against twisting and it may also be used additionally in the cases of the other exemplary embodiments.

In FIGS. 3a to d, various exemplary embodiments of the ring seal 12 are represented.

Figure 3A:
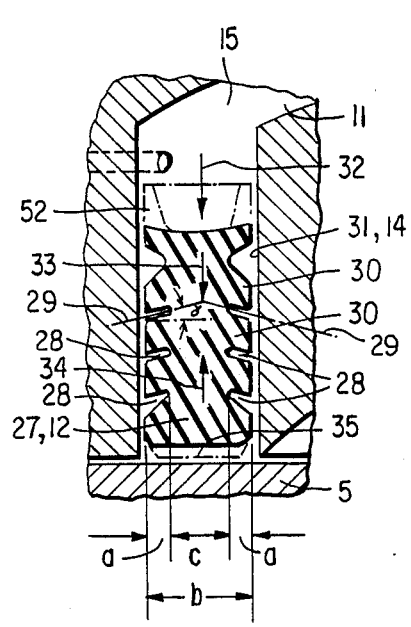

According to FIG. 3a, the ring seal 12, 27 has on both sides slits or incisions 28, which are upwardly directed in the form of a V. The angle of rise γ of the center line 29 of the slits 28 is about 5° to 20°. The oval-shaped or semielipse-shaped incisions 28 protrude by the amount a from the side flank into the ring seal, a being ≈¼ of the width b. Due to these incisions 28, arranged in the form of a V, a toggle lever effect is produced on pressurization of the ring seal 12, 27, i.e. the central seal region c is pressed downward against the machine part 5, while the webs 30 between the incisions 28 support themselves against& the wall 31. In FIG. 3a, the compressive force is identified by arrow 32 and the force acting as toggle lever force is identified by arrow 33 The V-shaped arrangement of the slits or incisions 28 produces a restoring force (arrow 34), which acts in the opposite direction. On pressurization, the ring seal 12, 27 is consequently pressed downward toward the cone plug 5 (see broken line 35), while on pressure relief the ring seal 12 withdraws into the annular channel back into the initial position due to the restoring force 34. Due to this arrangement, consequently no contact occurs between ring seal 12, 27 and movable machine part 5 in the pressureless state.

Figure 3B:
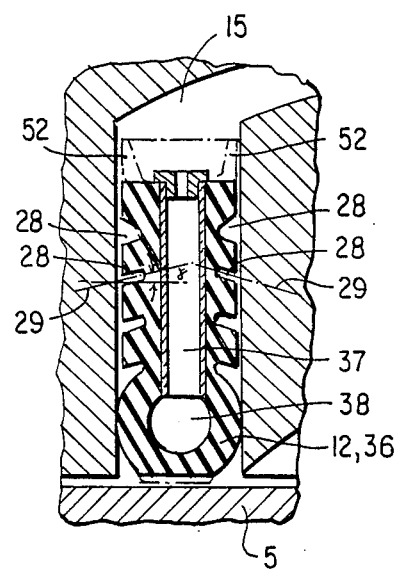

The exemplary embodiment according to FIG. 3b shows as a variant of FIG. 3a an inflatable ring seal 12, 36 in the lower region. Here, the pressure medium in the rear pressure space 15 can pass via the pressure pipe 37 to the pressure space 38 in the front region of the ring seal 12, 36. As a result, the ring seal 12, 36 becomes more flexible overall and, by increasing the pressure space 38, the sealing effect& with respect to the cone plug 5 can be accomplished easily.

Figure 3C:
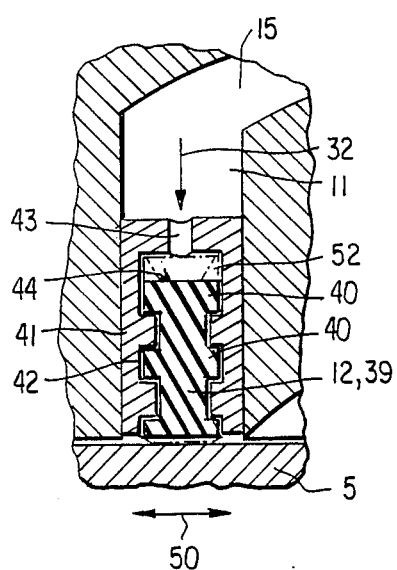

According to the exemplary embodiment according to FIG. 3c, the ring seal 12, 39 is provided with lateral projections 40, which serve as positive connecting element for the anchorage of the ring seal in the annular channel. For this purpose, in the exemplary embodiment according to FIG. 3c, an insert 41, inserted in the annular channel 11, is provided, which has grooves 42 for receiving the projections 40. Wherever possible with respect to production engineering, however, the walls of the annular channel may also be designed correspondingly profiled. The ring seal 12, 39 is consequently held by positive retaining elements 40, 42. Through an upper bore 43, or indirectly, the rear 44 of the ring seal 12, 39 can be pressurized with pressure medium, the central part again being pressed axially against the machine part to be moved, in particular the cone plug 5.

In order to prevent in principle the ring seal 12 slipping out from the annular channel, the latter can be held firmly, in particular glued, by its lateral flanks into the annular channel 11, or secured by an intermediate ring 26. This applies to all exemplary embodiments described.

Figure 3D:
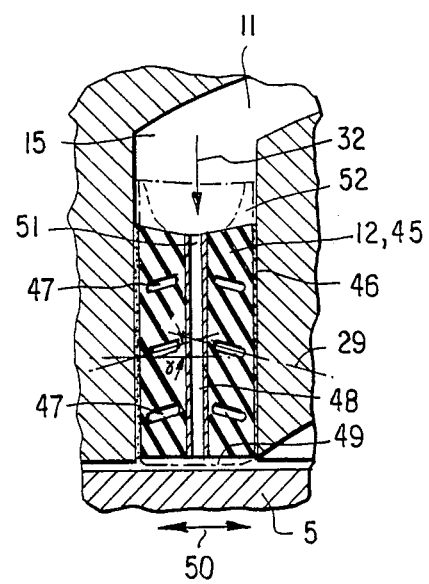

According to the exemplary embodiment according to FIG. 3d, the ring seal 12, 45 is likewise glued into the annular channel 11 by an adhesive layer 46 on its side walls. Instead of the slits or incisions 28 in FIGS. 3a and 3b, in the exemplary embodiment according to FIG. 3d, air inclusions 47 or other inclusions of a different material, likewise designed in the form of a V with respect to the longitudinal axis 51 of the seal, are used, which inclusions are likewise designed oval-shaped in their cross-section. The center lines 29' correspond to the arrangement of the center line 29 as described in FIG. 3a. As a result, again the toggle lever effect described in FIG. 3a is produced, with a restoring effect of the ring seal 12, 45.

The through-bore 48, represented in FIG. 3d, with small pipes inserted in the ring seal 12, 45, is to be used as an option. If the pressure space 15 behind the ring seal 12, 45 is pressurized with pressure medium, for example air, the latter can pass initially through the through-bore 48 and reaches the sealing-off region arranged at the face of the ring seal, according to the represented arrows 49. The gap to be sealed off in front of the ring seal is thereby pressurized with compressed air, which leads to a certain cleaning of the sealing surface and of the surface of the machine part 5 to be sealed off, i.e. the cone plug 5. The pressure prevailing in the pressure space 15 is set at such a level, i.e. the pressure drop due to the through-bores 48 is kept small enough, that the ring seal 12, 45 is nevertheless pressed axially against the part to be sealed off, as a result of which the front region of the through-bore 48 again closes due to resting of the ring seal 12, 45 on the machine part 5 The through-bore 48 consequently has a purging effect for the cleaning of the surface between the parts to be sealed off. For this purpose, a number of such bores are distributed around the circumference of the ring seal. In addition, as a result the ring seal is pressure-relieved whenever the seal is without opposing surface during plug adjustment and nevertheless there is to be pressure applied from the annular channel.

The mobility of the machine part 5 to be moved is indicated by arrow 50. It goes without saying that the movement only takes place in the non-sealed-off state, i.e. when the pressure space 15 behind the seal is pressure-relieved.

In the case of the seal designs according to FIGS. 3a to 3d, the seal regions facing the pressure space 15 may be designed as cap-type gasket section 52, as represented in broken lines in the drawing. Due to the laterally drawn-up walls of this cap-type gasket 52, a pressure relief takes place specifically in this upper lateral region, which leads to a sealing-off of this region. This has the same effect as for example in the case of the exemplary embodiment according to FIG. 2a, where the U-shaped seal design in the form of a cap-type gasket likewise leads to a partial development of pressure directed onto the side walls.

In the case of the exemplary embodiment of the invention represented in FIG. 4, a fixing of the inflatable ring seal 12, 53 is to be performed by the latter being firmly connected to a ring insert 54. The ring insert 54, as a precision casting, is adapted in its shape precisely to the annular channel 11, so that the position of the ring seal 12, 53 in the annular channel 11 is precisely fixed. In the representation according to FIG. 2b of the present application, the ring seal 12 was held in its axial position by a holding device formed by longitudinal struts 24. This holding device is optimized in the case of the exemplary embodiment according to FIG. 4 by the ring seal 12, 53 being firmly connected by its rear face 55 to the ring insert 54. This may be performed, for example, by a diagrammatically represented adhesive connection 56 or a diagrammatically represented positive connection 57. The ring insert 54 has at least one longitudinal bore 58 for the supplying of the pressure medium, in particular for the air supply to the pressure space 38 of the ring seal 12, 53. This longitudinal bore 58 opens out in the upper region into a transverse bore 59, which also serves as connecting bore for receiving a pressure medium supply valve 60 or an air supply connecting line 60. This air supply valve has in its front region a valve body 61 which is sealed off at the circumference, protrudes radially into the ring insert 54 and thus fixes the latter in its position.

The ring insert 54 has on its face 55 facing the ring seal 12, 53 a connecting piece 62, which is sealed off at the circumference and has in its front region a mushroom-shaped connecting nipple 63. This connecting nipple is thrust through the rear of the flexible ring seal and protrudes with its front end into the pressure space 38 of the ring seal 12, 53.

As revealed by FIGS. 1, 2 and 4, the annular channel 11 is designed in its shape, on account of the off-center position of the connection flanges 9, 10 with respect to the center axis of symmetry 64 of the rotary slide valve housing 1, as a space of complicated shape. This space is produced in the rotary slide valve housing relatively easily by the wall undercut 13 represented in FIG. 1 by machining, the axial length of which varying but nevertheless bounding the end position by the horizontal line 65 represented in FIG. 4. The shape of the ring insert 54 is then determined mathematically and produced in the casting process.

The face 66 of the inflatable ring seal 12, 53 facing the cone plug 5 is designed in the form of a V, in which arrangement the two lateral limbs 67, 68 are not to come into contact with the cone plug 5 at any point of the ring seal, at least in the pressureless state. In the pressurized state of the ring seal 12, 53, consequently as far as possible only the tip 69 of the V-shaped face 66 is to come into a line contact with the cone plug 5, in order to achieve as high a contact pressure as possible. The left position of the ring seal 53 represented in FIG. 4 has at its tip 69 a cone plug pitch angle of $\gamma_1 \approx 40°$. The clearance angle of the limb 68 necessary in this position is $\delta_1 \approx 5°$ to $10°$. This clearance angle $\delta_1$ is to be measured in the lowest position of the seal arrangement, i.e. in the region where the angle of rise $\gamma$ of the cone plug 5 has its greatest value.

The angle of rise $\delta_2$ of the limb 67 with respect to the horizontal 70 in FIG. 4 need not be made as large as the angle of rise $\delta_3 = \gamma_1 + \delta_1$, since no contact with the cone plug can take place on this side. This angle may be of the order of $\delta_2 = 15°$ with respect to the horizontal.

In FIG. 4, the angle of rise of the cone plug 5 in this position is shown in the right half of the figure by $\gamma_3$. Above the center line of symmetry 64 of the rotary slide valve housing, $\gamma_2 = 0$, i.e. at this point there is no offset of the two lateral flanks of the annular channel.

Otherwise, in FIG. 4 the same parts are drawn with the same reference numerals as in the previous figures, where necessary.

Figures 5, 5B:
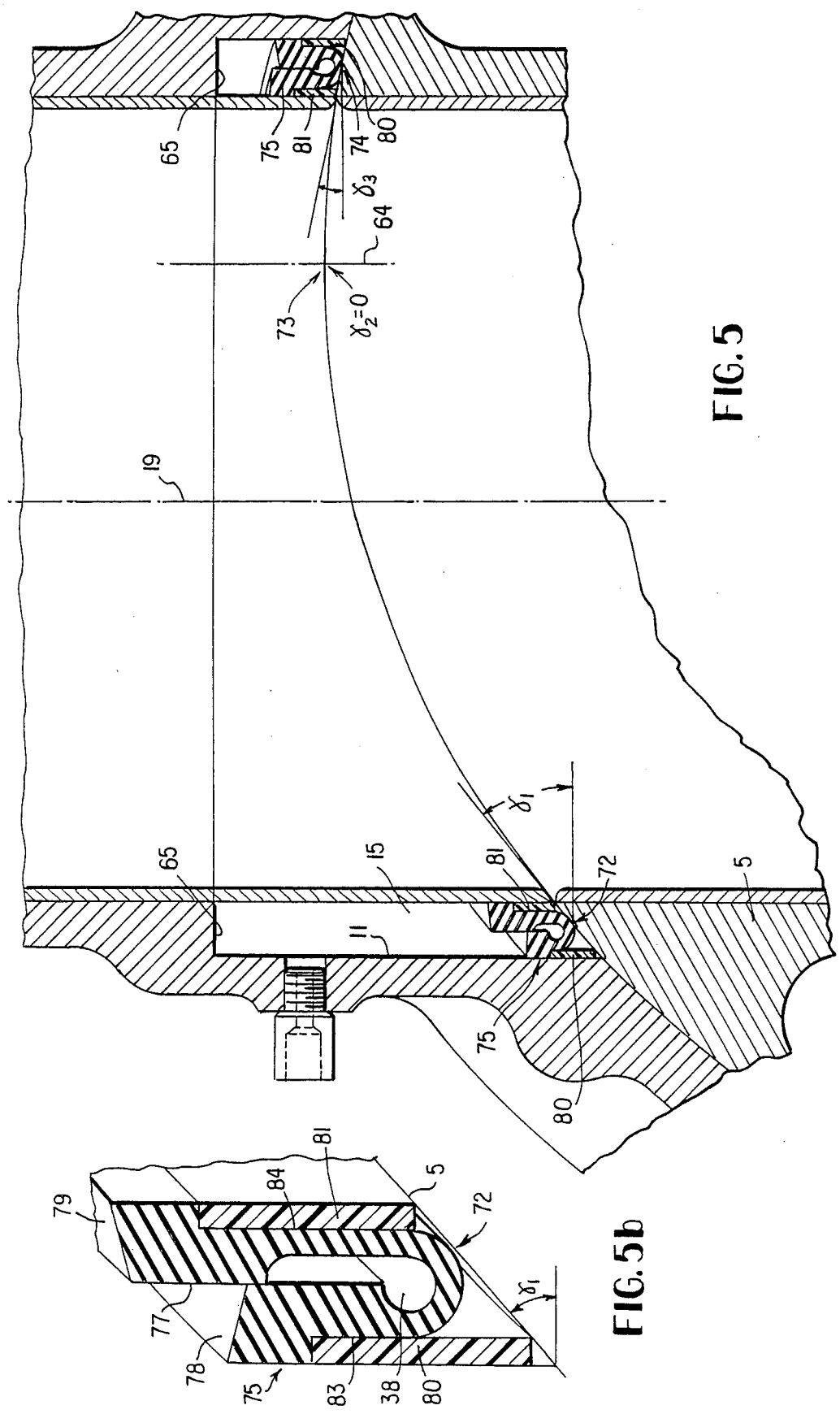

In the exemplary embodiment according to FIG. 5, an alternative seal arrangement is shown, which likewise has the task like the seal arrangement according to FIG. 4 of avoiding the seal being pulled out or sliding out, for example due to a tilting with the cone plug 5.

As revealed for example by FIG. 1, on account of the asymmetrical arrangement of the connecting flanges 9, 10, 10' and on account of the circular design of the cone plug 5, the ring seal 12 runs along a circular path in different sections of height. If the connection flange 10 is considered, the ring seal runs, with respect to the horizontal center line 71 (FIG. 1), from a lowest point 72 to a highest point 73, which is located above the center axis of symmetry 64, to a somewhat lower further point 74 (see FIGS. 1, 4, 5). These points are likewise entered once again in FIGS. 4 and 5 for clarity. As revealed in this respect by FIG. 5, the lateral flanks of the ring seal are set at different heights at each point with a tangent angle on the plug 5 $\gamma > 0$, i.e. each point to the side of the upper point 73. With such a conception, the ring seal 12, 53 to be used must consequently be adapted to the radius of curvature of the plug 5.

According to the representation according to FIG. 5, in particular the detailed representations 5a, 5b, here a completely symmetrically designed ring seal, as represented in FIG. 5a, can be used whenever this ring seal can adapt itself to the lateral displacement in height. For this purpose, the ring seal 12, 75 is provided in its longitudinal plane of symmetry 76 in its upper region, i.e. up to the cavity 38, with a longitudinal slitting 77, which allows the two seal halves 78, 79 to be displaced vertically with respect to each other. The cavity 38 is also pressurized with pressure medium through at least two half-bores 86 in the planes 76, 77 from the space 15. The symmetrical representation in FIG. 5a would exist at the uppermost point 73, i.e. at the point at which the tangent angle to the cone plug 5 is $\gamma_2 = 0°$ (see FIG. 5). In this case, the seal is held at the sides by two slide rings or back-up rings 80, 81, running round in the annular channel, on the upper face 82 of which ring the ring seal 75 supports itself against downward dropping out. The lowest point 72, represented in FIG. 5, is exhibited by a seal arrangement as represented in FIG. 5b, i.e. the lateral flanks of the seal 83, 84 are at different heights due to the tangent angle $\gamma_1$. As a result, a vertical displacement of the two seal halves 78, 79 occurs, since the two equally long back-up rings 80, 81 are at different heights Due to the longitudinal slitting 77, consequently an originally symmetrical seal 75 can adapt itself to the different position in the annular gap 11.

The slide rings or back-up rings 80, 81 are of flat material remaining constant in its dimensions, for example of plastic, such as Teflon or polyamide. The said rings are glued together with the seal 75 into the annular channel 11 and contact the cone plug 5 at the circumference.

The invention is not restricted to the exemplary embodiments represented and described. Rather, it also comprises all modifications and further developments which can be carried out by a person skilled in the art without inventive content of their own. In particular, the invention can be used for any problems involved with sealing off ring seals from convex movable machine parts. The ring seal is pressure-relieved during the movement of the machine part and can consequently ensure an easy mobility of the machine part without itself being exposed to frictional wear.

We claim:

1. A seal arrangement for sealing against a convex surface of a movable cylindrical machine part disposed in a cylindrical housing, comprising:
   a cylindrical connection flange having a center axis, said flange being connected to the housing and having an annular recess with a varying height and running concentrically around the center axis of said flange;
   a push-in pipe insertable in said flange and defining with said annular recess an annular channel which has a first open end adjacent the convex surface of the machine part and a second closed end opposite said first end;
   a flexible ring seal disposed in said annular channel at said first end and defining a pressurizable cavity for receiving a pressurized medium;
   a ring insert fixably disposed in said annular channel between said ring seal and the second end of said channel, said ring insert being connected to said ring seal and having a longitudinal bore for supplying a pressure medium to the pressurizable cavity of said ring seal; and
   means for supplying a pressure medium to the longitudinal bore of said ring insert for controlling an axial stroke of said ring seal for pressing said ring seal against the convex surface of the matching part.

2. A seal arrangement as defined in claim 1, and including fastening means for fastening said ring insert to said sealing ring.

3. A seal arrangement as defined in claim 2, wherein said fastening means comprises glue.

4. A seal arrangement as defined in claim 2, wherein said fastening means comprises locking means for lockingly engaging said ring insert to said ring seal.

5. A seal arrangement as defined in claim 1, wherein said supplying means comprises a connecting body protruding into said ring insert for fixing the position of said ring insert and being sealed about its circumference with respect to said ring insert; and said ring insert has a face facing said ring seal and a connecting piece, sealed about its circumference with respect to said ring seal, and including a mushroom-shaped projecting end protruding from said face into the pressurizable cavity of said ring seal.

6. A seal arrangement as defined in claim 1, wherein said ring seal, in its region facing the convex surface of the machine part, has a V-shaped face having two lateral limbs coming together to form a V-shaped tip which, in a pressureless state of said ring seal, does not contact the convex surface of the machine part, and during a pressurized state of said ring seal contacts the convex surface of the machine part along a line of contact between said tip and the convex surface.

7. A seal arrangement as defined in claim 1, wherein the matching part is a rotary slide valve with a cylindrical cock plug arranged in a cylindrical housing, and further including three of said seal arrangements arranged on the housing, the center axes of which are offset with respect to axes of symmetry of the housing.

* * * * *